Sept. 7, 1943. W. O. SCHULTZ Re. 22,372

FUSE

Original Filed April 24, 1939 4 Sheets-Sheet 1

INVENTOR.
WILLIAM O. SCHULTZ

BY

Arthur R. Woolfolk
ATTORNEY.

Sept. 7, 1943. W. O. SCHULTZ Re. 22,372

FUSE

Original Filed April 24, 1939 4 Sheets-Sheet 2

INVENTOR.
WILLIAM O. SCHULTZ
BY
Arthur R. Woolfolk
ATTORNEY.

INVENTOR.
WILLIAM O. SCHULTZ
BY
Arthur R. Wolfe
ATTORNEY.

FUSE

Original Filed April 24, 1939 4 Sheets-Sheet 4

INVENTOR.
WILLIAM O. SCHULTZ
BY Arthur R. Woodford
ATTORNEY.

Reissued Sept. 7, 1943

Re. 22,372

UNITED STATES PATENT OFFICE 22,372

FUSE

William O. Schultz, South Milwaukee, Wis., assignor to Line Material Company, South Milwaukee, Wis., a corporation of Delaware Original No. 2,249,178, dated July 15, 1941, Serial No. 269,613, April 24, 1939. Application for reissue June 17, 1943, Serial No. 491,248

24 Claims. (Cl. 200—116)

This invention relates to fuses and is particularly directed to an expulsion type of drop-out fuse.

Objects of this invention are to provide a novel type of fuse device which may be of the housed type, and in which a fuse tube normally completes a circuit between upper and lower contacts and, upon blowing, ejects the fuse link and also slides downwardly so that a part of it projects below the lower portion of the housing giving an indication that the fuse has blown.

Further objects of this invention are to provide a slidable type of drop-out fuse in which novel means are provided for very quickly and forcibly extracting any remaining unburned portion of the fuse link, such means causing the fuse link to be withdrawn substantially in line with the fuse tube, thereby overcoming any tendency of sticking due to the link dragging over the end of the tube, and also permitting the use of relatively stiff fuse link leaders.

In greater detail, further objects are to provide a flip-out and fuse tube releasing device which is so made that it quickly and forcibly ejects the unburned portion of the fuse link, thereby causing a quick interruption of the circuit within the fuse tube itself, and which thereafter releases the fuse tube and allows the fuse tube to slide downwardly to inoperative position out of the electric circuit.

Further objects are to provide a fuse construction in which a quick operating flip-out device is provided for withdrawing any remaining portion of the fuse link, in which this flip-out device, due to the momentum acquired by it in fuse extracting motion upon rupture of the fuse link, transmits force to a retaining lever by the momentum of the flip-out device itself and assists in rocking the lever to fuse releasing position, the lever being biased towards fuse releasing position by the weight of the fuse tube and by the pressure of an upper spring contact.

Further objects are to provide a construction in which the flip-out device acts as a spring cushioning means for taking up any slack in the fuse link after refusing and which acts as a cushioning member when the door of the fuse device is suddenly closed, thereby preventing the transmission of any undue stress to the fuse link itself.

Further objects are to provide a drop-out fuse of the sliding type which is so constructed that there is no chance of the fuse sticking in place after the fuse link has been ruptured, in which a complete interruption of the circuit and withdrawal of the fuse link occurs on either heavy or light overloads, and in which this operation is performed very quickly.

An embodiment of the invention is shown in the accompanying drawings in which.

Figure 7:
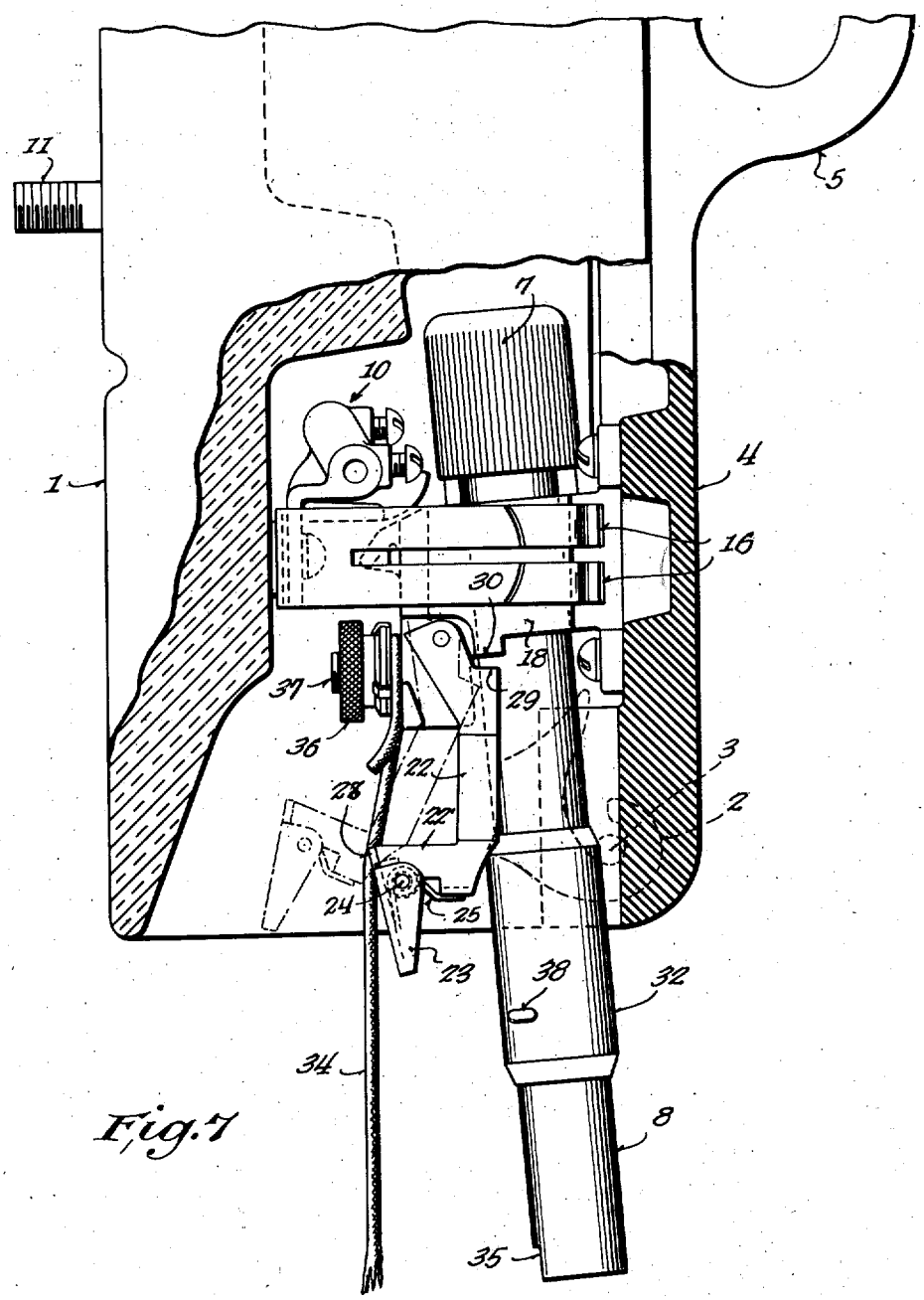
Figure 7 is a view of the lower portion of Figure 1, showing the parts as they appear after the fuse has blown.

Referring to the drawings, it will be seen that the fuse comprises a casing 1 of porcelain or other suitable material which is provided with hooks 2, see Figure 7, adjacent its lower portion. The hooks removably receive the headed trunnions 3 of a door 4 formed of suitable insulating material, such as a phenolic condensation product. The door is provided with an eyelet portion 5 by means of which it may be opened or closed, and with a web 6 on its inner side having a rounded portion to accommodate the upper cap 7 of the fuse tube 8.

The housing carries an upper terminal member indicated generally at 9 and a lower terminal member indicated generally at 10. The upper and lower terminal members are provided with conductor receiving portions, as shown, and the conductors may extend outwardly through the usual apertures in the sides of the housing.

The housing is provided with any suitable means, such as indicated at 11, whereby it may be attached to a support. The upper terminal or contact is provided with a contact spring 12 which may be formed of laminated structure, as shown, and one end of the spring may be folded over, as indicated at 13 in Figure 1. The spring has a flat lower portion that bears firmly against the upper flat face of the cap 7 of the upper contact of the fuse tube. This upper terminal is also provided with a pair of relatively heavy spring arms 14, as shown in Figure 2, and these arms are provided with inwardly depressed portions 15 which fit around in front of the upper cap 7 of the fuse tube. The arms 14 do not bind against the upper cap of the fuse tube. However, they assist in holding the door in closed position and guard against the door being jarred open even if the device is mounted on a support subject to considerable vibration.

Figure 6:
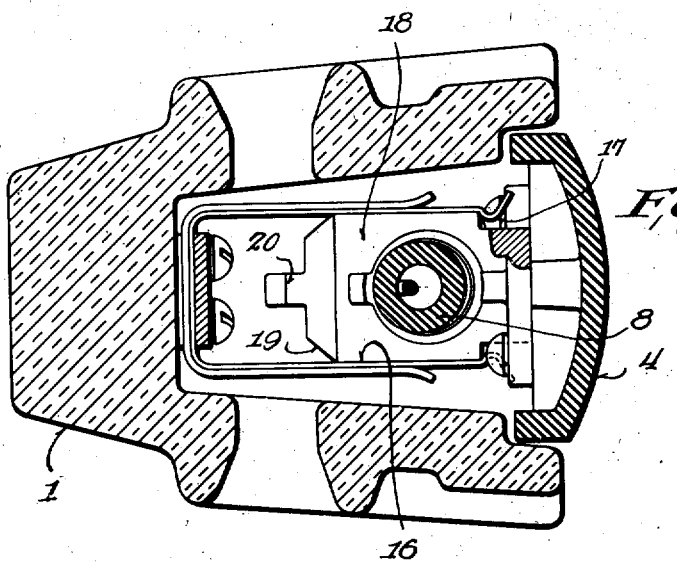
Figure 6 is a sectional view on the line 6—6 of Figure 1.

The door is also held closed by the lower spring arms or contact members 16 which have slightly inturned ends 17, as shown in Figure 6. The spring arms 16 may be formed of laminated structure, as shown in Figure 6.

The door rigidly carries a lower contact block or sleeve 18, see Figures 1, 3, 6 and 7. This sleeve or lower contact of the fuse tube is provided with bevelled portions 19 to assist in spreading the spring arms 16 of the lower terminal member. The contact 18 is also provided with a rearwardly projecting ear 20 which is positioned beneath a forwardly projecting, overhanging ear 21 carried by the lower terminal to provide a stop for resisting the tendency towards upward recoil when the fuse blows.

Figure 1:
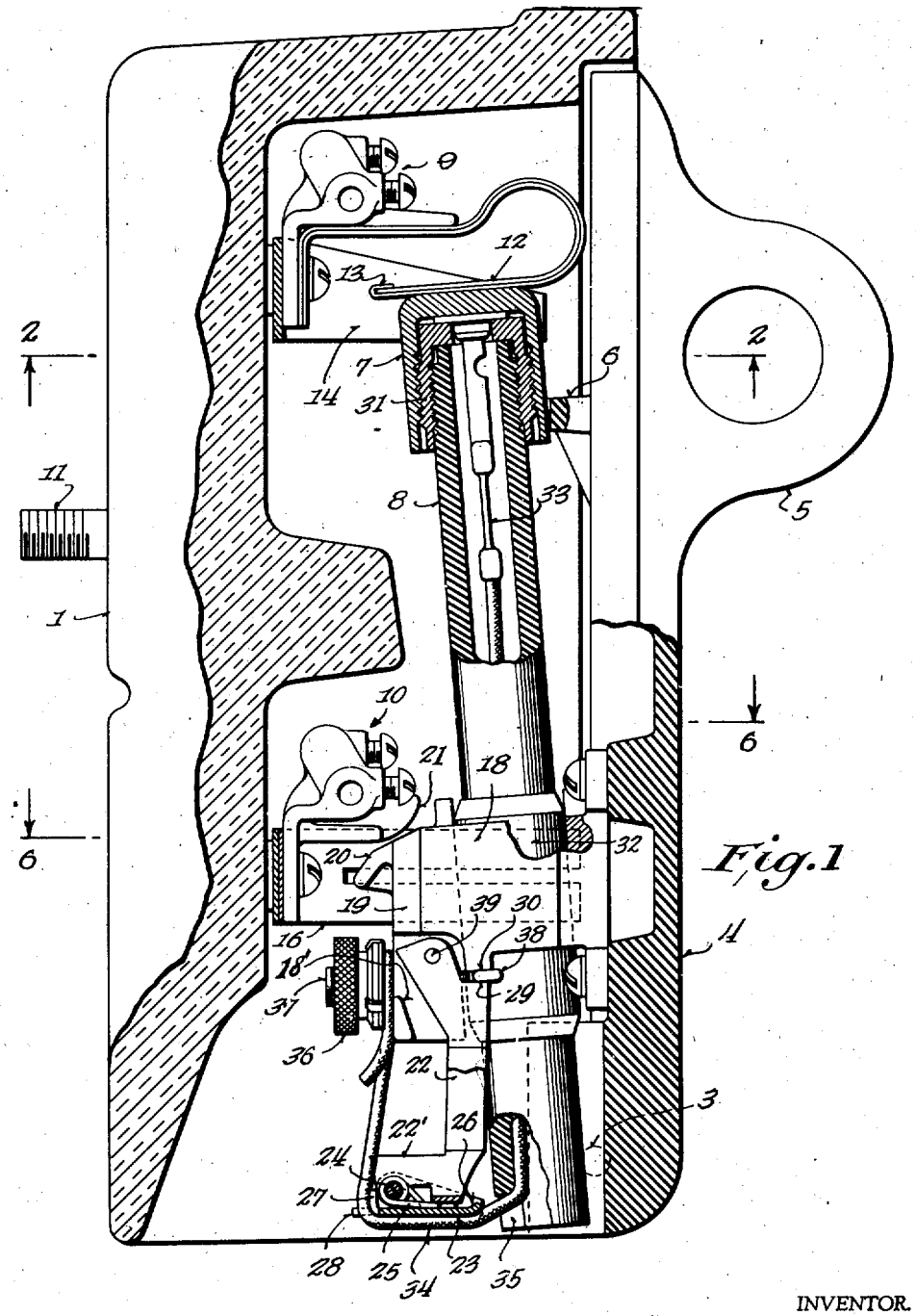
Figure 1 is an elevation of the device, partly in section, showing the fuse in operative position.
Figure 2:
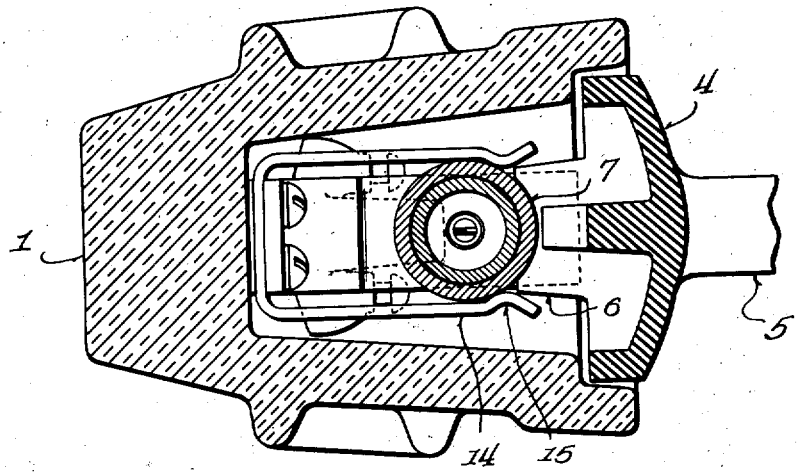
Figure 2 is a sectional view on the line 2—2 of Figure 1.
Figure 3:
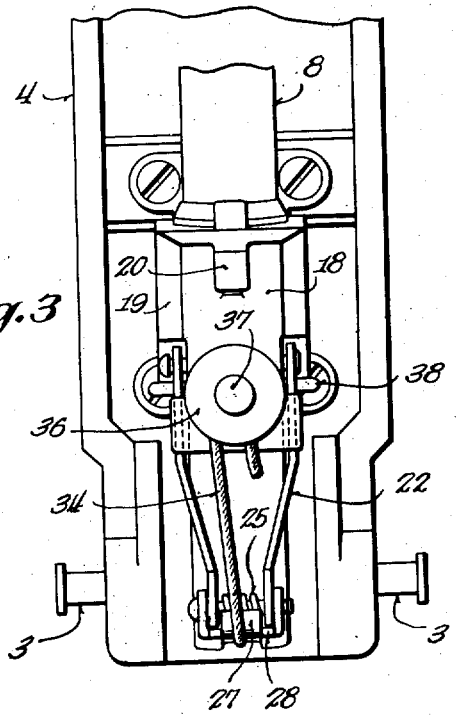
Figure 3 is a face view of the lower portion of the door and the associated parts detached from the housing.
Figure 4:
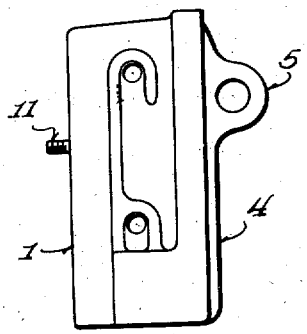
Figure 4 is a side elevation of the device.

The lower contact 18 carries a U-shaped lever 22, see Figures 1, 3 and 7, which lever in turn pivotally carries a flip-out device 23, see particularly Figures 1 and 7. The flip-out device is mounted upon a pivot pin 24 extending across the lower portion of the lever 22, and a spring 25 is loosely coiled about the pin and bears against the flip-out and against a portion of the lever urging the flip-out towards clockwise rotation, as viewed in Figure 1.

The flip-out is preferably provided with a slightly rounded front edge portion 26 and with a rounded rear edge portion 27, and with a pair of lips 28 on opposite sides of the rear edge portion. These lips are adapted to engage the laterally projecting bottom side portions 22′ of the lever 22 after the flip-out has operated, as shown in Figure 7.

The contact sleeve 18 is provided with stops 18′ for limiting the outward motion of the lever 22.

The lever 22 is provided with shouldered portions 29 on opposite sides thereof which are normally positioned below the stops or downwardly projecting portions 30 of the sleeve 18.

The fuse tube 8 is provided with an upper ferrule 31 which is screw-threaded thereon and which is externally threaded to receive the upper cap 7 which constitutes the upper contact of the fuse tube. At an intermediate portion the fuse tube carries a metal ferrule 32 which is provided with tapered upper and lower portions as shown in Figures 1 and 7. This metal sleeve loosely and slidably fits within the sleeve 18 fixedly carried by the door. It is provided to prevent any possibility of binding of the fuse tube within the sleeve 18 in the event the fuse tube should swell, and insures free sliding of the fuse tube through the sleeve under all conditions.

Normally the fuse tube is held in place in its upper position, as shown in Figure 1, by means of a fuse link which includes the fusible section 33 and a leader 34. The leader extends outwardly through the bottom open end of the fuse tube and is guided through the notch 35 formed in the bottom marginal portion of the fuse tube and extends over the flipper 23 and upwardly to a position below the thumb screw 36, the thumb screw 36 being screwed on a threaded stem 37 rigidly carried by the lower contact or sleeve 18.

Figure 5:
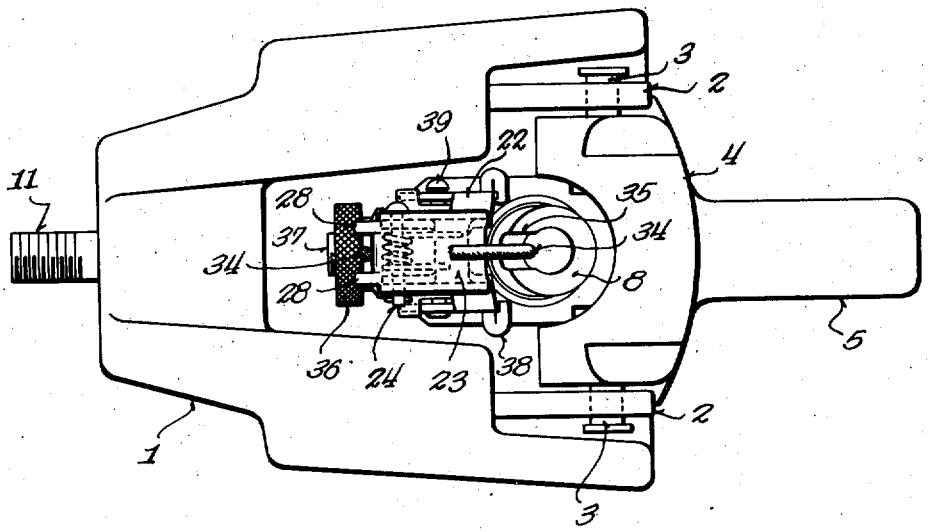
Figure 5 is a bottom plan view of the structure.

The sleeve 32 is locked to the fuse tube by a transversely extending pin 38 which passes through the sleeve and through a notched portion of the fuse tube, not shown, and which has inturned ends to prevent its lateral displacement. The inturned ends are most clearly shown in Figure 5.

The pin 38 normally bears against the shouldered portion 29 of the lever 22. It is to be noted, however, that the pivot point 39 of the lever 22 is spaced laterally from the shouldered portion 29 so that when the tube is freed by rupture of the fuse link, the weight of the tube together with the spring pressure exerted by the upper contact spring 12 will rock the lever 22 to the left, as viewed in Figure 1, and thus release the tube for downward sliding motion, the final position of the parts being shown in Figure 7.

It is to be noted particularly that the flipper 23 in rocking about the pin 24, causes its outer or free end adjacent the bottom of the fuse tube to rock substantially straight downwardly for a portion at least of its stroke and consequently it is possible to use stiffer leaders with this construction as it does not require the making of a sudden bend in the link when the flipper operates, particularly in the early portion of the stroke of the flipper.

Additionally, it is to be noted that the flipper executes a very quick stroke and quickly interrupts the circuit within the fuse tube and forcibly withdraws the remaining portion of the fuse link and avoids any tendency of sticking or binding of the leader at the lower end of the fuse tube for, as stated, the flipper executes a stroke which is substantially downwardly with reference to the lower end of the fuse tube and thereby projects the link in substantial alignment with the fuse tube.

It is to be noted further as shown in the dotted line position of Figure 7, that the momentum of the flipper when the flipper is brought to rest by the contacting of its fingers 28 with the adjacent portion of the lever 22, assists in throwing the lever 22 to the left, as viewed in Figure 7, and as shown in dotted lines, so that this action assists the action of the fuse tube in disengaging itself from the lever 22.

A further advantageous result from this construction is due to the fact that inevitably there is some slack in the fuse link when it is clamped beneath the clamp thumb screw 36. Therefore, if there is any shock imparted to the link by slamming the door shut, the flip-out device acts as a spring buffer to relieve or cushion any shock to the fuse link.

It will also be seen that the flipper operates immediately prior to the sliding downwardly of the tube and as there is very little inertia to the flipper in comparison to the inertia to the other parts, it is obvious that the flipper will execute a very quick stroke and quickly interrupt the circuit in the fuse tube prior to the breaking of the circuit by the motion of the upper contact cap 7 downwardly away from the upper contact spring 12.

While the flip-out device has been illustrated as employed with a sliding type of drop-out fuse tube, it is obvious that it can be employed with other types. It is obvious that the flip-out device can be employed whether the construction involves a housed or an unhoused type of tube. Further, the flip-out device if desired may be carried on the pivot link which pivot link is pivotally carried by supports at its lower end and is pivoted to the fuse tube at its upper end. This last construction is specifically claimed in my copending application Serial No. 307,350, filed December 4, 1939, for Fuses.

Although this invention has been described in considerable detail, it is to be understood that such description is intended as illustrative rather than limiting, as the invention may be variously embodied and is to be interpreted as claimed.

I claim:

1. A drop-out fuse comprising supporting means having a stationary upper contact and a lower contact, a fuse tube having an upper contact normally engaging said stationary upper contact and having an open lower end, a fuse link extending from the upper contact of said fuse tube outwardly from the open end and electrically connected to said lower contact, said fuse tube being movably supported from said support and movable from operative to inoperative position, movable latching means adjacent the lower portion of said fuse tube for normally holding said fuse tube against motion from operative to inoperative position, and a flip-out device carried by said latching means and over which said fuse link is looped, said flip-out device being biased towards fuse link extracting motion and having motion with respect to said latching means independently of any motion of said latching means.

2. A drop-out fuse comprising supporting means having a stationary upper contact and a lower contact, a fuse tube having an upper contact normally engaging said stationary upper contact and having an open lower end, a fuse link extending from the upper contact of said fuse tube outwardly from the open end and electrically connected to said lower contact, said fuse tube being movably supported from said supporting means, movable latching means adjacent the lower portion of said fuse tube for normally holding said fuse tube against motion, a flip-out device pivoted on said latching means and engaging a portion of said fuse link, and a spring urging said flip-out device towards fuse link extracting motion, said flip-out device withdrawing any unburned portion of said fuse link outwardly from said fuse tube substantially in line with said fuse tube.

3. A drop-out fuse comprising supporting means having a stationary upper contact and a lower contact, a fuse tube having an upper contact normally engaging said stationary upper contact and having an open lower end, a fuse link extending from the upper contact of said fuse tube outwardly from the open end and electrically connected to said lower contact, said fuse tube being movably supported from said support, movable latching means adjacent the lower portion of said fuse tube for normally holding said fuse tube against motion, a flip-out device pivoted to said latching means, and a spring engaging said flip-out device and said latching device and urging said flip-out device towards motion with reference to said latching means.

4. A drop-out fuse comprising a support having an upper stationary contact and having a lower contact, a fuse tube slidably mounted in said lower contact and having an upper contact normally engaging the upper contact of said support and movable away therefrom when said fuse tube slides downwardly, a latching lever normally restraining said fuse tube against sliding, a spring biased flip-out lever pivoted on said latching lever, and a fuse link extending from the upper contact of said fuse tube through said fuse tube to said lower contact and secured to said lower contact, said link being looped over said flip-out lever.

5. A drop-out fuse construction comprising a support having an upper stationary contact and a lower contact, a fuse tube slidably mounted in said lower contact and having an upper contact adapted to normally engage the upper stationary contact and movable away from said upper stationary contact when said fuse tube slides downwardly, said fuse tube having an open lower end and having a projecting portion, a latching lever mounted on said lower contact and normally engaging said projecting portion to restrain said fuse tube against sliding motion, a spring urged flip-out lever pivotally mounted on said latching lever and located adjacent the lower portion of said fuse tube, and a fuse link extending from the upper stationary contact of said fuse tube to said lower contact and looped over said latching lever and said flip-out lever.

6. A drop-out fuse construction comprising a support having an upper stationary contact and having a lower contact, a fuse tube slidable through said lower contact and having projecting portions on opposite sides of said fuse tube, a U-shaped latching lever pivoted to said lower contact and having shoulders on opposite sides normally engaging said projecting portions and restraining said fuse tube against sliding motion, a flip-out lever pivoted adjacent the lower portion of said latching lever, a spring between said latching lever and said flip-out lever urging said flip-out lever towards outward motion, and a fuse link extending from the upper contact of said fuse tube to the lower contact and looped over said flip-out lever, said flip-out lever having a free end adjacent the lower portion of said fuse tube for extracting any remaining portion of the fuse link in a direction substantially in line with said fuse tube.

7. A drop-out fuse construction comprising an upper and a lower contact, a fuse tube slidably mounted with reference to said contacts, a fuse link normally electrically joining said contacts and extending through said fuse tube and outwardly from the lower end of said fuse tube, a pivotally mounted latching lever having shoulder means, projecting means carried by said fuse tube and normally engaging the shoulder means of said pivoted latching lever, a flip-out lever pivotally mounted adjacent the lower end of said latching lever and over which said fuse link is looped, and a spring between said latch lever and said pivoted flip-out lever urging said pivoted flip-out lever towards fuse link extracting motion, said flip-out lever having a portion adapted to engage said latching lever upon completion of the outward stroke of such flip-out lever, whereby the momentum of said flip-out lever will tend to rock said latching lever to releasing position.

8. A drop-out fuse construction comprising a support having a stationary upper contact and having a lower contact, a fuse tube slidably mounted within said lower contact and having an open lower end and a closed upper end provided with an upper contact normally engaging said stationary upper contact, a latching lever, said fuse tube and said latching lever having normally interengaging parts to restrain said fuse tube against sliding motion, said latching lever being pivoted to said lower contact at a point spaced from said interengaging parts, whereby the weight of said fuse tube tends to rock said latching lever to latch releasing position, a spring biased flip-out lever pivotally mounted on the lower portion of said latching lever, and a fuse link extending from the upper contact of said fuse tube outwardly from the lower end thereof to the lower contact and looped over said flip-out lever.

9. A drop-out fuse construction comprising a support having a stationary upper contact and having a lower contact, a fuse tube slidably mounted within said lower contact and having an open lower end and a closed upper end provided with an upper contact normally engaging said stationary upper contact, a latching lever, said fuse tube and said latching lever having normally interengaging parts to restrain said fuse tube against sliding motion, said latching lever being pivoted to said lower contact at a point spaced from said interengaging parts, whereby the weight of said fuse tube tends to rock said latching lever to latch releasing position, a spring biased flip-out lever pivotally mounted on the lower portion of said latching lever, and a fuse link extending from the upper contact of said fuse tube outwardly from the lower end thereof to the lower contact and looped over said flip-out lever, said flip-out lever having a quick fuse link extracting motion independent of the motion of said latching lever.

10. A drop-out fuse construction comprising a support having a stationary upper contact and having a lower contact, a fuse tube slidably mounted within said lower contact and having an open lower end and a closed upper end provided with an upper contact normally engaging said stationary upper contact, a latching lever, said fuse tube and said latching lever having normally interengaging parts to restrain said fuse tube against sliding motion, said latching lever being pivoted to said lower contact at a point spaced from said interengaging parts, whereby the weight of said fuse tube tends to rock said latching lever to latch releasing position, a spring biased flip-out lever pivotally mounted on the lower portion of said latching lever, and a fuse link extending from the upper contact of said fuse tube outwardly from the lower end thereof to the lower contact and looped over said flip-out lever, said flip-out lever having a quick fuse link extracting motion independent of the motion of said latching lever, and said latching lever being movable outwardly after said flip-out lever has operated to assist in the further extraction of any remaining portion of said fuse link upon rupture of the fuse link.

11. A drop-out fuse construction comprising a support having an upper stationary contact and a lower contact, a fuse tube slidably mounted in said lower contact and having an upper contact normally engaging said stationary upper contact, said fuse tube having laterally projecting portions, a U-shaped latching lever pivoted on opposite sides to said lower contact and having shouldered portions spaced laterally from the pivot and normally engaging the projecting portions of said fuse tube, a channel-shaped flip-out lever pivoted adjacent the lower portion of said latching lever, a fuse link extending from the upper contact of said fuse tube to the lower contact and looped over said flip-out lever, and a spring urging said flip-out lever towards outward motion with reference to said latching lever.

12. A housed type drop-out fuse comprising a casing having upper and lower stationary contacts, said lower stationary contact having a pair of spaced arms with inturned ends, a door pivotally mounted on said housing and having a lower contact adapted to enter between the arms of said lower stationary contact and having shouldered portions adapted to seat back of the inturned ends of the arms of said lower stationary contact, a fuse tube slidably carried by the contact of said door and having an upper contact normally engaging the upper stationary contact, a latching lever pivoted to the contact of said door, said latching lever and said fuse tube having interengaging portions normally restraining said fuse tube against sliding motion, a flip-out lever carried by the latching lever and spring urged outwardly with reference to said latching lever, and a fuse link extending from the upper contact of said fuse tube over said flip-out lever to the contact carried by said door.

13. A housed type drop-out fuse comprising a housing having upper and lower stationary contacts, a door pivotally mounted on said housing and having a lower contact adapted to engage the stationary lower contact, a fuse tube slidably mounted in the contact of said door and having an upper contact adapted to engage the upper contact of said housing, at least one of the contacts of said housing having inturned ends adapted to normally prevent opening of said door, a latching lever pivotally mounted on the contact of said door, said latching lever and said fuse tube having normally interengaging portions, a spring pressed flip-out lever pivotally carried by the lower portion of said latching lever and having a free end positioned adjacent the lower end of said fuse tube, and a fuse link extending from the upper contact of said fuse tube over said flip-out lever to the contact carried by said door.

14. A housed type drop-out fuse comprising a housing having upper and lower stationary contacts, a door pivotally mounted on said housing and having a lower contact adapted to engage the stationary lower contact, a fuse tube slidably mounted in the contact of said door and having an upper contact adapted to engage the upper contact of said housing, at least one of the contacts of said housing having inturned ends adapted to normally prevent opening of said door, a latching lever pivotally mounted on the contact of said door, said latching lever and said fuse tube having normally interengaging portions, a spring pressed flip-out lever pivotally carried by the lower portion of said latching lever and having a free end positioned adjacent the lower end of said fuse tube, and a fuse link extending from the upper contact of said fuse tube over said flip-out lever to the contact carried by said door, said upper contact including a spring normally bearing downwardly on the upper contact of said fuse tube.

15. A housed type drop-out fuse comprising a housing having upper and lower stationary contacts, a door pivotally mounted on said housing and having a lower contact adapted to engage the stationary lower contact, a fuse tube slidably mounted in the contact of said door and having an upper contact adapted to engage the upper contact of said housing, at least one of the contacts of said housing having inturned ends adapted to normally prevent opening of said door, a latching lever pivotally mounted on the contact of said door, said latching lever and said fuse tube having normally interengaging portions, a spring pressed flip-out lever pivotally carried by the lower portion of said latching lever and having a free end positioned adjacent the lower end of said fuse tube, and a fuse link extending from the upper contact of said fuse tube over said flip-out lever to the contact carried by said door, said upper contact including a spring normally bearing downwardly on the upper contact of said fuse tube, said lower stationary contact and the contact carried by said door having means adapted to interengage and to prevent shifting of said door due to recoil upon blowing of said fuse.

16. A fuse construction comprising supporting means having a stationary upper contact and a lower contact, a fuse tube having an upper contact normally engaging said stationary upper contact and having an open lower end, a fuse link extending from the upper contact of said fuse tube outwardly from the open end and electrically connected to said lower contact, a flip-out device pivoted adjacent the lower portion of said fuse tube and extending substantially transversely of the axis of said fuse tube, said flip-out device having a free end engaging a portion of said fuse link and adapted to extract any unburned portion of said fuse link with a substantially downward motion from said fuse tube and being movable without requiring the motion of any other portion of the fuse construction, and means for urging said flip-out device towards fuse extracting motion independently of motion of other portions of the fuse construction.

17. In a fuse construction including an insulating support having a pair of relatively spaced terminals, the combination with an expulsion fuse cartridge normally bridging said terminal and having at least one end open, a mounting for said cartridge pivotally supported by said support, a first lever pivotally carried by said mounting adjacent the open end of the cartridge, a spring biasing the first lever for pivotal movement, a second lever pivotally mounted on the free end of the first lever, a second spring biasing the second lever for pivotal movement independently of the pivotal movement of the first lever, and a fuse link in said cartridge electrically connecting said terminals and normally holding said levers against movement by said springs.

18. In a fuse construction including an insulating support having a pair of relatively spaced terminals, the combination with an expulsion fuse cartridge normally bridging said terminals and having at least one end open, a mounting for said cartridge pivotally supported by said support, a first lever pivotally carried by said mounting adjacent the open end of said cartridge, a spring biasing the first lever for pivotal movement, a second lever pivotally mounted on the free end of the first lever, a second spring biasing the second lever for pivotal movement independently of the pivotal movement of the first lever, and a fuse link in said cartridge electrically connecting said terminals and normally holding said levers against movement by said springs, said second lever extending transversely relative to the axis of said cartridge when held by said fuse link.

19. In a circuit interrupting construction, an expulsion cartridge having at least one end open, in combination with a support for said cartridge, first and second conductor extracting levers, said first lever being pivotally mounted at one end on said support and normally extending to the open end of said cartridge and said second lever being pivotally mounted on the free end of said first lever and normally extending transversely of said cartridge adjacent said open end, biasing means urging said levers about their individual pivotal mountings and away from said open end, said biasing means urging said second lever about its pivotal mounting on said first lever irrespective of the pivotal movement of said first lever, and a circuit interrupting conductor in said cartridge extending from said open end and holding said levers in their normal positions as aforesaid.

20. In a circuit interrupting construction, an expulsion cartridge having at least one end open, in combination with a support including a terminal for said cartridge, first and second conductor extracting levers, said first lever being pivotally mounted at one end on said support and normally extending to the open end of said cartridge and said second lever being pivotally mounted on the free end of said first lever and normally extending transversely of said cartridge adjacent said open end, biasing means urging said levers about their individual pivotal mountings and away from said open end, said biasing means urging said second lever about its pivotal mounting on said first lever irrespective of the pivotal movement of said first lever, a circuit interrupting conductor in said cartridge extending from said open end and holding said levers in their normal positions as aforesaid, and clamping means on said terminal connecting said conductor directly thereto.

21. In a circuit interrupting construction, an expulsion cartridge having at least one end open, in combination with a support for said cartridge including a terminal for said cartridge, first and second conductor extracting levers, said first lever being pivotally mounted at one end on said support and normally extending to said open end of said cartridge and said second lever being pivotally mounted on the free end of said first lever and normally extending transversely of said cartridge adjacent said open end, biasing means urging said levers about their individual pivotal mountings and away from said open end, said biasing means urging said second lever about its pivotal mounting on said first lever irrespective of the pivotal movement of said first lever, a circuit interrupting conductor in said cartridge extending from said open end and holding said levers in their normal positions as aforesaid, and clamping means on said terminal connecting said conductor directly thereto, said conductor extending longitudinally across said second lever transversely of its pivotal connection with said second lever.

22. In a fuse construction including an insulating support having a pair of relatively spaced terminals with an expulsion fuse cartridge normally bridging said terminal, said cartridge having at least one end open, a mounting for said cartridge pivotally supported by said support, a first lever pivotally carried by said mounting adjacent the open end of the cartridge, said first lever being biased for pivotal movement, a second lever pivotally mounted on the free end of the first lever, said second lever being biased for pivotal movement independently of the pivotal movement of the first lever, and a fuse link in said cartridge electrically connecting said terminals and normally holding said levers against movement by said biasing means.

23. In a fuse construction including an insulating support having a pair of relatively spaced terminals with an expulsion tube cartridge normally bridging said terminals, said cartridge having at least one end open, a mounting for said cartridge pivotally carried by said support, a first lever pivotally carried by said mounting adjacent the open end of said cartridge, a spring biasing the first lever for pivotal movement, a second lever pivotally mounted on the free end of the first lever, a second spring biasing the second lever for pivotal movement independently of the pivotal movement of the first lever, and a fuse link in said cartridge electrically connecting said terminals and normally holding said levers against movement by said springs, said first lever being substantially parallel to the axis of said cartridge when held by said fuse link, said second lever extending transversely relative to the axis of said cartridge when held by said fuse link.

24. In a fuse construction including an insulating support having a pair of relatively spaced terminals with an expulsion fuse cartridge normally bridging said terminals, having at least one end open, a mounting for said cartridge pivotally supported by said support, a first lever pivotally carried by said mounting adjacent the open end of the cartridge, a means biasing the first lever for pivotal movement, a second lever pivotally mounted on the free end of the first lever, a second means biasing the second lever for pivotal movement independently of the pivotal movement of the first lever, and a fuse link in said cartridge electrically connecting said terminals and normally holding said levers against movement by said biasing means, said levers deriving their biasing power from different sources, neither lever depending upon the other and each operating regardless of whether or not the other operates.

WILLIAM O. SCHULTZ.